United States Patent [19]

Wu

[11] 4,403,742

[45] Sep. 13, 1983

[54] USE OF ROD MILL FOR INITIAL STAGE OF SOLDER GLASS GRINDING

[75] Inventor: Marinda L. Wu, Fremont, Calif.

[73] Assignee: The Dow Chemical Company, Midland, Mich.

[21] Appl. No.: 206,333

[22] Filed: Nov. 13, 1980

[51] Int. Cl.³ .................. B02C 17/20; B02C 19/12
[52] U.S. Cl. .................................. 241/29; 241/30; 241/152 A; 241/170; 241/184; 429/218
[58] Field of Search .......... 241/30, 29, 152 A, 152 R, 241/170, 184, 26; 429/218

[56] References Cited

U.S. PATENT DOCUMENTS

| | | | |
|---|---|---|---|
| 2,210,357 | 8/1940 | Beament | 241/182 X |
| 2,232,696 | 2/1941 | Earle | 241/182 X |
| 3,022,017 | 2/1962 | McKenna | 241/184 X |
| 3,269,668 | 8/1966 | Hall | 241/182 X |
| 3,353,753 | 11/1967 | Wolfgram | 241/184 X |
| 3,486,706 | 12/1969 | Weyand | 241/184 |
| 3,521,825 | 7/1970 | Morcom | 241/182 X |
| 3,917,490 | 11/1975 | Brown | 429/218 |

OTHER PUBLICATIONS

"Action in a Rod Mill", *Engineering & Mining Journal,* vol. 161, No. 3, pp. 82–85.

Primary Examiner—Willie G. Abercrombie
Attorney, Agent, or Firm—R. R. Stringham

[57] ABSTRACT

A dramatic reduction in the time required to fine-grind high borate solder glasses is achieved. In the prior art method, the glass is ball-milled in the presence of an amine for about seven days or more. It has now been discovered that by first rod-milling such glasses for a period of from about ½ to about 24 hours, the time required for the "amine grind" can be shortened to a period of from about 1 to 3 days. A further improvement is that rod milling eliminates the laborious sieving procedure previously employed to ensure the absence of undesirably large particles in the feed to the amine grinding operation.

4 Claims, No Drawings

USE OF ROD MILL FOR INITIAL STAGE OF SOLDER GLASS GRINDING

BACKGROUND OF THE INVENTION

Solder glasses find a number of applications, such as in sealing capacitors (U.S. Pat. No. 3,770,404); joining components of colored T.V. picture tubes (U.S. Pat. No. 3,770,404) and as "tubesheets" in hollow fiber-type sodium/sulfur battery cells.

The latter application requires the use of very finely ground solder glasses, which cannot be produced by ordinary grinding methods.

U.S. Pat. Nos. 3,476,602, 3,765,944 and 3,791,868 provide detailed descriptions of high temperature, sodium/sulfur cells, wherein the electrolyte/separator takes the form of a large number of $Na^+$ ion-conductive, glass, capillary tubules or hollow fibers. Briefly, however, the cells may be described as comprising a generally cylindrical container for the catholyte ($Na_xS_y$, for example) and a generally cylindrical reservoir for the anolyte ($Na^\circ$, for example) which are abutted against and joined in sealing arrangement to an intervening, horizontal, electronically non-conducting "tubesheet" disc. Fine, hollow glass fiber lengths having their lower ends closed and their upper ends open pass through the tubesheet in sealing engagement therewith. The open ends of the fibers communicate with the molten alkali metal in the anolyte reservoir and the portions of the fibers dependent from the tubesheet are immersed in the molten catholyte. U.S. Pat. No. 3,791,868 describes a method of forming such a cell in which the glass fiber lengths are arrayed in parallel on a metal foil strip and a band of a tacky paste comprising a powdered solder glass is deposited on and between the fibers adjacent their open ends. The foil and fibers are then rolled into a bundle, the paste is devolatilized and the glass particles joined to form the tubesheet. The foil is employed as the cathodic current collector in the cell and the anolyte reservoir itself functions as the anodic current distributor.

The glass component of the paste preferably is a high borate glass.

U.S. Pat. No. 3,917,490 discloses that it is possible to reduce high borate glass particles to powders suitable for tubesheet fabrication by ball milling them in the presence of at least 0.5 wt. % of an aliphatic amine, for a total of about 7 days or more. Elevated temperatures are not required for the first stage of grinding but are necessary during the second stage—the last 1–3 days of (finish) grinding.

Prior to development of the preceding method, no way of fine-grinding high borate glasses was known. However, a substantial reduction in the grinding time required for this method would constitute a considerable further advance.

Application of the patented method to production of glass fines for utilization in tubesheets could also stand improvement in another respect. That is, it has been considered that really efficient grinding of the $-325$ mesh solder glass particles in the feed to the amine grind cannot be achieved if that feed also includes $+325$ mesh particles. This necessitates a laborious and time-consuming sieving operation. Any substantial reduction in sieving requirements would be highly desirable.

The '490 patent teaches that any other suitable type of mill can be employed in place of the porcelain ball mill actually used in the examples. That is, the glass particles can be ground with the amine in a porcelain mill containing porcelain or metal balls or in other mills which are the functional equivalent thereof. There is, however, no suggestion in the patent that any improvements might result from using other types of mills.

Furthermore, the substitution of a rod mill for the ball mill is generally contraindicated when the product powder is to be used to fabricate articles in which close packing of the particles is essential. That is, the particle size distribution known to be characteristic of ball-ground materials is more suitable for attainment of close packing (which is a prerequisite for impermeable tubesheets, for example). The particle size distribution of materials ground by rod milling is generally considered to be less amenable to close packing.

In order to be suitable for fabrication of tubesheets by presently known methods, the (amine-coated) glass powder produced in the grinding operation must be capable of forming a thixotropic, high-solids content paste or slurry with a volatilizeable suspending agent, such as (for example) cumene containing 1–2 wt. % of 1-hexadecylamine. That is, the paste must be extrudeable under pressure but also capable of maintaining the shape imposed on it until it is devolatilized, etc.

The slurries actually used in making such tubesheets not only include the glass powder but also about an equal weight of highly spherical particles, of the same glass, having diameters within the range of from about 45 to about 104 microns. This combination of larger, essentially spherical particles, and $25\mu$ or less, more irregularly shaped particles having the size distribution patterns characteristic of ball milled fines approximate, in performance, a mixture of somewhat smaller ($\sim 80\mu$) spheres and spherical fines, corresponding to the "binodal" size distribution which would be considered ideal for close packing between 70–80$\mu$ diameter fibers spaced about 200–400$\mu$ apart.

It has been found that in order to yield finished fines which—when used as above-described—yield strong, impermeable tubesheets, the product of the first stage of grinding should meet certain specifications.

That is, it is generally desirable that the particles to be finish-ground have volume average diameters greater than 7, up to at least 11 microns and at least 95 wt. percent of the particles have maximum dimensions less than 25$\mu$; also, the dispersity factor (ratio of volume average diameter to number average diameter, or $\Sigma(nD^4)/\Sigma(nD^3) \div \Sigma(nD)/\Sigma n$—where n=# of particles having a diameter D) should have a value greater than 4, up to at least 5. Otherwise, the final product is more likely to include too many particles in the 4–8$\mu$ and 20$\mu$ and up size ranges and too few in the 10–14$\mu$ range.

The foregoing specifications can be met by first-stage products made by the method disclosed in the '490 patent, but only at the expense of prolonged grinding times—even if no $+325$ mesh particles are present in the feed glass. A need for a more efficient first-stage grinding method has been evident for some time, but attempts to modify the disclosed method, such as by using steel balls instead of porcelain "balls" (short cylinders), have not been successful.

OBJECTS OF THE INVENTION

The primary object of the present invention is to provide a simpler, more rapid method for converting high borate glasses to powders which will yield fines suitable for tubesheet fabrication when finish-ground by the method of the cited '490 patent.

It is also an object to eliminate the need for interruption of grinding to remove the +325 mesh particles.

Another object is to eliminate the need for an amine (or other grinding aid) during first-stage grinding of high borate glasses.

An additonal object is to provide a more reproducible method of making high borate glass powders having particle size and shape characteristics considered desirable for fabrication of strong, impermeable tubesheets (for hollow fiber-type, high temperature battery cells) from a particular glass.

A further object is to avoid contamination of the ground glasses with particles of hard materials, such as alumina.

Yet another object is to facilitate mill clean-out after first-stage grinding of high borate glasses.

Still other objects will be made apparent to those skilled in the art by the following specifications and claims.

SUMMARY OF THE INVENTION

It has now been discovered that the foregoing objects can be attained by pre-grinding the high borate glass in a rod mill, provided that the rods used are heavy enough and hard enough (but are not brittle) and the grinding period is at least half an hour long but is terminated before substantial overgrinding occurs.

The ineffectiveness of milling procedures, other than rod-milling, for attainment of reduced grinding times is illustrated by comparative examples (No.'s 2, 3 and 5) herein.

The most important application of the invention presently known is in the preparation of tubesheets for hollow fiber-type sodium/sulfur battery cells. However, it is also of advantage in preparing high borate glass powders to be employed for other purposes.

The present invention may be more precisely defined as the method of grinding an alkali metal borate glass which comprises:

a. charging to a rod mill particles of said glass comprising from about 60 to about 97 mole percent of $B_2O_3$ and a total of from about 3 to about 30 mole percent of one or more alkali metal oxides, said glass having a Vickers hardness number of from about 200 to about 700, said rods and the mill lining having Vickers numbers higher than that of the glass and being composed of the same or different, non-brittle materials;

b. grinding said glass in said mill for at least ½ hour but not longer than the time required to convert the glass particles to a powder having preselected particle size characteristics.

Preferably, the operation of steb b is continued until the particles have a volume average diameter greater than 7 microns, up to about 11 microns, and a dispersity factor greater than 4, up to about 11, and the process includes an additional step:

c. grinding the resultant powder with ALUNDUM (trademark of Norton Co.) balls, while in contact with a $C_{12}$-$C_{42}$ aliphatic amine and at a temperature which is greater than 50° C. but less than the softening point of said glass, until at least some of the particles constituting said powder have been reduced to fragments having effective diameters less than one micron.

DEFINITIONS

By a "rod" is meant a generally cylindrical, solid object having a length-to-diameter ratio of about 3 or more.

By a "non-brittle" rod or mill lining material is meant one having a high resistance to cracking and chipping under the operating conditions for which the mill is designed.

Reference herein to the "mill contents" is intended to include the rods and the air (or other ambient atmosphere) present in the mill.

By a "spheroidal" particle is meant a particle of such a shape that the volume of the largest sphere which can be contained in the particle is at least 99% of the volume of the particle. By "essentially spherical particles" is meant particles of which at least 95% are spheroidal.

Unless otherwise specified, particle "size" or "diameter" means the average length of all rectilinear surface-to-surface distances through the center of gravity of the particle.

The term "sintered", as applied herein, means joining the particles of tubesheet glass to form a non-porous, monolithic member, without converting the particle mass to a homogeneous melt. This may be regarded as ordinary sintering prolonged beyond formation of mere point and edge connections between otherwise discrete particles.

DETAILED DESCRIPTION

High borate glasses which may advantageously be ground by the method of the present invention are those which (1) comprise from about 60 to about 97 mole % of $B_2O_3$ and a total of from about 3 to about 30 mole percent of one or more alkali metal oxides, and (2) have a Vickers hardness number of from about 200 to about 700. Such glasses may consist of $B_2O_3$ and alkali metal oxides alone or may additionally comprise substantial amounts of from one to several other components—such as, for example, $SiO_2$, alkali metal halides, alkaline earth oxides, tin oxides, lead oxides, sulfides and other chalcogenides.

Preferred glasses are those which have been found useful in the fabrication of tubesheet/hollow fiber assemblies in high temperature battery cells—such as, for example, sodium/sulfur battery cells. The compositions, hardness and applications of several such glasses are given in Table 1 below.

Among the latter glasses, the "ternary" glasses are most preferred; i.e., those comprising from about 90 to about 94 mole percent of $B_2O_3$, from about 3.5 to about 5 mole percent $Na_2O$ and from about 2.6 to about 5 mole percent $SiO_2$.

Particularly preferred are ternary glasses consisting essentially of from 93 to 93.8 mole percent $B_2O_3$, from 3.5 to 4 mole percent $Na_2O$ and from 2.7 to 3 mole percent $SiO_2$.

TABLE 1

| Glass | Composition Mol %'s | | | | Vickers Hardness Number | Application in Na/S Cell |
|---|---|---|---|---|---|---|
| | $B_2O_3$ | $Na_2O$ | $SiO_2$ | NaF | | |
| 1 | 97 | 3 | 0 | 0 | | — |
| 2 | 96 | 4 | 0 | 0 | ~200* | Tubesheet |
| 3 | 95.5 | 4.5 | 0 | 0 | | " |
| 4 | 94 | 6 | 0 | 0 | | " |
| 5 | 93.5 | 3.7 | 2.8 | 0 | 300 | " |
| 6 | 90.9 | 4.9 | 4.2 | 0 | | " |
| 7 | 74.1 | 5.3 | 5.3 | 15.3 | | Fibers |

TABLE 1-continued

| Glass | Composition Mol %'s | | | | | Vickers Hardness Number | Application in Na/S Cell |
|---|---|---|---|---|---|---|---|
| | $B_2O_3$ | $Na_2O$ | $SiO_2$ | NaF | | | |
| 8 | 71.9 | 4.3 | 2.2 | 21.6 | | | " |
| 9 | 69.8 | 4.3 | 4.3 | 21.6 | | | " |
| 10 | 62.5 | 6.3 | 6.3 | 25.0 | | | " |
| 11 | 59.5 | 29.8 | 5.9 | NaCl | 4.8 | 700 | " |
| 12 | 58.9 | 29.5 | 0 | NaF | 8.7 | | " |
| | | | | $MgF_2$ | 2.9 | | " |

*Estimated. The measured hardness of glass number 3 on the Moh scale is about 4.5.

The method of the invention of course is of greatest advantage for the grinding of softer glasses, i.e., those having a Vickers hardness number of from about 200 to about 300. However, harder glasses, when otherwise at least as good for a given application, will generally be preferred, as requiring less grinding. For glasses having a Vickers hardness up to about 450, a substantial advantage can still be realized for the present grinding method and at least a minimal advantage may be realized with some glasses having hardness numbers on up to about 700.

High borate solder glasses are readily made by melting a mixture of the component oxides (or corresponding carbonates), halides, etc. Optionally, some of the ingredients (such as $Na_2O$ and $SiO_2$) may be introduced to a melt of the other ingredients as a pre-reaction product (such as sodium silicate, for example). Typically, melt temperatures of about 900°–1000° C. are employed and the melt is remixed several times while being purged with dry nitrogen over a prolonged period of time. To facilitate subsequent pulverization the molten glass may be formed as flat flakes by dripping it between appropriately spaced rollers. Platinum has been found to be a suitable lining material for the molten glass reservoir or "dripper tank".

A Braun pulverizer was previously employed to reduce the flakes to −40 mesh particles, which were then sieved to separate a −325 mesh fraction for ball milling. It has now been found that when a rod mill is employed the latter operations can be dispensed with and the flakes charged directly to the mill.

High borate solder glasses are generally hygroscopic and should be kept in as dry an environment as it is feasible to provide. Preferably, preparation, storage, grinding and utilization of such glasses is at a relative humidity of not more than 5%. The bulk moisture content of a glass melt purged with about 100 cubic feet (S.T.P.) of dry nitrogen per kilogram of glass will usually be substantially less than 0.2 wt. %. Bulk moisture contents as high as 0.2 wt. % have apparently caused some caking during grinding operations and bulk moisture levels of less than 0.1 wt. % are preferred. Similarly, it is believed desirable to maintain the surface moisture content of the glass well below 0.1 wt. %. To this end, whatever steps as are necessary should be taken to avoid moisture take-up from the mill components by the glass. The mill may be pre-dried by means such as heating it in an oven for a time and at a temperature which may readily be determined empirically, without undue experimentation. If desired, the moisture content of the rod-milled product can be lowered (as by drying in vacuo at a somewhat elevated temperature) before it is subjected to finish grinding.

It has been found that not only the rods, but also the mill liner, should be composed of materials harder than the glass. No upper limit on mill component hardness is apparent, except that some of the harder known materials are undesirably brittle. The presence in tubesheet fines of even quite small amounts of materials—such as alumina—having a Vickers hardness greater than about 800 is considered detrimental. Although alumina grinding media are satisfactory for finish-grinding of tubesheet glasses, the use of alumina rods in the initial grinding step generally results in detrimentally high alumina contents in the rod-milled (and finished) products. Of course, for applications other than in tubesheet/hollow fiber assemblies, substantially higher alumina contents may be tolerable, and alumina rods may be suitable.

The preferred rod and liner material is stainless steel. Such impurities as may be introduced to the glass by wear of the stainless steel are apparently non-detrimental, at least in the small concentrations (up to about 0.4 wt. %) involved. Also, stainless steel is particularly convenient in that the mill and rods can readily be cleaned with water, without concern for rusting. Of course, glasses having a Vickers hardness number higher than that of austenitic steel (about 450) would not be expected to grind well in steel mills.

Although experiments have established that individual rod weight is not a very critical parameter of the rod milling operation, faster grinding during the first couple of hours may be achieved using heavier rods. Not only does faster breakdown of a coarse glass (flake) feed result when heavier rods are used (in the same number), but more rapid size reduction of −325 mesh particles also occurs—even in the presence of larger particles. Good results have been obtained using from five to seven "identical" rods, weighing from about 500 to about 1900 grams each, to grind charges of from 100 to 300 grams of glass in an 8" diameter, stainless steel "jar". In ordinary practice, all of the rods will have about the same dimensions and weight.

As indicated earlier herein (definitions of terms) the rods used should have a length-to-diameter ratio of at least 3. At the other extreme, the only limit to rod length is that imposed by practical considerations, such as efficient utilization of floor space, etc. As a general rule, however, length-to-diameter ratios of from about 5 to 10 will be found highly satisfactory.

It is not necessary, but it is preferred, that the rods have essentially a cylindrical shape, i.e., have essentially a circular cross-section perpendicular to the rod axis.

The shape of the mill lining surface may be smooth, wavy or ridged. The mill which has given the best results has a lining surface gently ridged ("scalloped") in the form of eleven smooth but non-symmetrical, shallow waves of varying width and depth, parallel to the central axis of the mill.

The number of rods employed is not critical but at least three rods will ordinarily be used. Preferably, the number of rods in the mill is at least 5 but not more than 7.

The proportion of the internal mill volume occupied by the rods is also not critical but operation outside of the range of about 1/20 to about ⅓ of the mill volume is considered impractical. A ratio of about ¼ is preferred.

Similarly, the ratio of glass weight to total rod weight is not critical but should be within the range of from about 0.1 to about 1.0, in order to achieve a practical rate of production of adequately ground powders. A weight ratio of from about 0.1 to about 0.25 is preferred.

The rate at which the rod mill is rotated is not considered critical but will influence the grinding time required to achieve the desired particle size reduction. A rate of about 75 RPM has been found highly satisfactory for grinding up to 200 grams of glass in a 8.4" O.D.×9.4" long stainless steel mill containing five 8.5"×1.25" diameter stainless steel rods weighing about 1367 grams each. Rates of from about 45 to about 105 RPM are considered generally suitable; a rate in the range of from about 65 to 85 RPM is preferred.

Ambient temperatures are highly suitable for the rod-milling operation and are preferred. However, subnormal temperatures, as low as are feasible to maintain, and elevated temperatures—up to about the softening point of the glass—may be employed.

Grinding times as short as thirty minutes suffice to accomplish substantial grinding in the rod mill, at least for glasses having a Vickers hardness above 300. Rod milling may be continued for up to 24 hours, or even longer, depending upon the particle size and shape characteristics desired for the product powder. However, if grinding is prolonged beyond a certain point, the number of smaller particles is increased—at the expense of the larger particles—but very little further decrease in size of the smaller particles results. In fact, reaggregation of the smallest particles may tend to occur to a substantial extent. In the case of glass fines to be finish-ground for use in tubesheet fabrication, such prolonged grinding also produces a too-uniform powder, i.e., one with a dispersity factor of about 4 or less. In other words, over-grinding results in too narrow a particle size distribution.

As a general rule, rod milling times of from about 1 to 10 hours will be appropriate for production of glass powders having dispersity factors greater than 4. For tubesheet glasses having a Vickers hardness of about 400 down to about 250, times of from about 2 to about 8 hours are preferred. In any case, however, the optimum time for conversion of a given glass to a powder best approximating one having certain particle size and shape characteristics can readily be determined. A series of glass samples are withdrawn from the mill, after successively longer grinding times, and examined with a scanning electron microscope and/or a particle sizing device such as an HIAC PC-320 Particle Size Analyzer, a Coulter Counter or a Quantimet-720 Image Analyzer.

In the present state of the art, a certain amount of trial and error evaluation will usually be required to establish the particle size characteristics to be achieved in the rod-milling stage; i.e., the characteristics desired for the feed to the amine grind.

When the end product is to be used as tubesheet fines, the evaluation can be carried out with a minimum of experimentation as follows. Rod-milling is initiated. At one-hour intervals thereafter, grinding is interrupted, a representative sample of the glass particles removed, and grinding is resumed. Ordinarily, a total of about 8 to 12 samples (8-12 hours of grinding) will be sufficient. The mill contents and the samples—except the last one—are stored dry.

The last sample is immediately subjected to amine grinding, which is continued for at least 72 hours. A slurry or "paste" is prepared (in the manner described subsequently herein) from the amine-ground product and tested for extrudeability from a syringe. If extrusion is feasible, the ability of the extrudate to resist slumping is checked. If it does not slump to an intolerable degree, at least one tubesheet/fiber assembly is prepared from the slurry and tested for tightness to helium (as described later herein).

If the results are not satisfactory, the amine-grinding can be resumed for another several hours and another "final" sample tested as above, etc. However, if the test results are satisfactory, the sample taken half way through the rod-milling operation (i.e., after 4-6 hours of milling) is amine ground and tested as above.

If the latter sample yields a satisfactory tubesheet, the sample taken after 2-3 hours of milling is amine ground and tested; if not, the sample taken after 6-9 hours of milling is amine ground and tested, and so on. In other words, the "standard" search protocol, familiar to those skilled in the art, is followed. When the least-milled sample capable of yielding satisfactory tubesheets is identified, it is characterized by examination. Thereafter, the characteristics so established may be utilized as a control for routine production of amine grind feed by rod-milling. And, of course, the minimum times required for both the rod-milling and amine-grinding steps can be determined by further tests.

It is a distinct advantage of the present grinding method that it is not necessary to include any amine or other grinding aid with the glass in the rod mill. However, the use of grinding aids is not excluded and any material which does not detrimentally effect the grinding efficiency or the properties of the product glass, to an intolerable extent, may be present in the mill. Preferably, of course, any such material introduced will be one from which the milled glass can readily be separated to the extent necessitated by the requirements of the contemplated end use for the glass.

For those applications in which the rod-milled glass requires "polish"- or finish-grinding, this may be accomplished essentially in the manner disclosed in earlier-cited U.S. Pat. No. 3,917,490, the disclosure of which is incorporated herein by reference. The glass powder is ground in contact with an aliphatic, long-chain amine, at an elevated temperature, until it approximates as closely as is feasible a powder having the desired particle shape and size characteristics for the contemplated end use.

Suitable amines are aliphatic amines containing a chain of at least 12 carbons and having a total of up to 42 carbons. Dodecylamine and hexadecylamine—particularly the latter—are preferred. The amine is employed in an amount which is at least sufficient to provide a monomolecular layer on the particle surfaces and will usually constitute from about 1 to 2 wt. % of the powder/amine mixture. About 1.5 wt. % of 1-hexadecyl amine has been found to give excellent results.

Temperatures in the range of from about 85° to about 105° C. are considered quite effective. The range of from about 90° to about 100° C. is preferred.

Finish-grinding times of from about 24 to about 72 hours have been found generally appropriate for conversion of rod-milled glasses to fines suitable for tubesheet fabrication.

The mill used for the finish-grind is preferably one having a mullite lining and containing alumina or ALUNDUM cylinders having a length to diameter ratio of from 1 to about 1.5. Mullite grinding media are apparently not commercially available, but it is believed they would be satisfactory. Really good results have not been attained with steel balls.

If the finish-ground glass is to be used for tubesheet fabrication, steps should be taken to keep the surface moisture content of the finished glass below about 0.5 wt. %, and preferably below 0.05 wt. %.

The other parameters of the finishing operation are considered non-critical and are illustrated in the examples herein.

It has been found that in addition to further particle size reduction and smoothing, another very important effect of the finishing operation on "tubesheet fines" is deaggregation of the glass particles and coating of their surfaces with the amine.

EXAMPLES

The following examples are for purposes of illustration and are not to be construed as limiting the scope of the present invention in a manner inconsistent with the claims appended to these specifications.

All of the following examples involve experiments directed toward preparation of fines for tubesheet fabrication—the most exacting utility known for solder glasses. The (empirical) criteria used to evaluate the fines were: (1) maximum solids content and rheological properties of "paste" prepared from fines (and "spheres"), (2) helium leak rate of the sintered tubesheet/hollow fiber assembly and (3) strength of fibers in the sintered assembly. In addition, some fines were examined with a scanning electron microscope (SEM) and/or particle size counting means.

Procedures

"Spheres" typically were prepared by passing particles of crushed glass, ranging in size from about 45 to about 147 microns, through a natural gas flame and then sieving out the 45–104 micron ($-150+325$ mesh) spherodized particles. Ordinarily, the spheres and fines employed to make a given tubesheet paste were of the same chemical composition.

Tubesheet pastes were prepared by mixing about equal weights of the spheres and the amine-coated fines with an amount of a 1–2 wt. % solution of one or more long chain amines in cumene such that the solids constituted about 84–91 weight percent of the mixture.

The rheological properties of the pastes were evaluated by attempting to extrude them in one continuous band from a syringe and by observing their resistance to slumping or flowing when not subjected to other than gravitational forces. If the paste extruded smoothly but retained the shape imposed on it (as in an uncured tubesheet), it was rated as "thixotropic". If any substantial degree of blocking occurred during extrusion, the paste was rated as unsuitable for tubesheet fabrication and, if it also tended to slump or flow, as "dilatant". In some instances, adequately thixotropic pastes could be made at lower solids contents, but this generally results in poorer particle packing and a higher permeability (for the sintered tubesheet/fiber assembly).

Tubesheet/hollow fiber assemblies were formed essentially in the following manner. Ten thousand, 10 cm lengths of 70 micron O.D., 50 micron I.D. hollow glass fiber, closed at one end only, are disposed in parallel array on a horizontal strip of carbon-coated aluminum foil, about 7.5 cm wide and 12.5 microns thick, with their axes perpendicular to the foil edges and at a uniform spacing along the foil of about 370 fibers per cm. The open ends of the fibers extend about 3.8 cm beyond one edge of the foil and the other foil edge extends about 2.6 cm beyond the closed ends of the fibers. The fibers consist of a sodium borosilicate glass as described in U.S. Pat. No. 3,829,331.

A spacer strip of aluminum, about 1 cm wide and 100 microns thick, is laid on top of the foil with its inner edge at a distance of about 1.6 cm from the closed fiber ends.

A bead of the solder glass paste, about 0.5 cm wide, is extruded onto the portions of the fibers extending beyond the foil. The foil spacer strip, fiber array and paste bead are then rolled up on a 0.5×5 cm aluminum tube like a rug. The paste is thereby formed into a coherent mass, i.e., an unsintered tubesheet.

The rolled assembly is stood on end with the open ends of the fibers extending above the body of paste. The roll is heated, in vacuo, to the fusion temperature of the tubesheet glass and kept under those conditions for 1¾ hours, thereby devolatilizing and sintering the paste and forming a unitary, non-porous glass tubesheet bonded in sealing relationship with the fibers.

The method used to determine whether or not a tubesheet was "leaky" (permeable or cracked) was to subject the cured tubesheet/fiber assembly to a helium-leak test with a commercial helium detector—a Varian, Model 925-40, mass spectrograph unit which can detect helium flows as small as $10^{-9}$ cc (S.T.P.) per second. A glass vessel having the general shape of a funnel is inverted over the open-ended fiber portions and sealingly engaged (with an epoxy resin) to the tubesheet edge. The "stem" of the "funnel" is connected by a rubber tube to the helium detector. Helium gas is passed through the mandrel (the aluminum tube, which does not contact the tubesheet) and radially outward between the fibers and across the lower tubesheet face. If the rate of helium flow through the detector is so low ($<10^{-9}$ cc/second) as not to be detectable, the assembly (and thus the tubesheet) is considered leakfree. If the tubesheet structure is not completely fused, leak rates of from about $10^{-9}$ to $10^{-7}$ cc/second are typically observed and the leakage is essentially uniform across the tubesheet surface. If a pair of fibers are in continuous longitudinal contact with each other, i.e., if they constitute a "doublet", the spaces immediately adjacent the line of contact will generally not be filled with the tubesheet material and a laterally non-uniform leak rate of about $10^{-6}$ cc/second or less is typically experienced. A laterally non-uniform rate in the range of about $10^{-5}$ to $10^{-2}$ cc/second generally indicates a broken fiber. Further evidence of the source of a leak is obtained by the effect on the helium flow rate of various heat treatments or other leak-sealing techniques.

If a fiber has been broken off (usually just below the tubesheet), another assembly must be made (and handled more carefully) or the bad fiber must be plugged selectively. An alternative procedure (for testing of tubesheet tightness) which avoids the latter difficulty is to employ solid, rather than hollow, fibers in forming the tubesheet/fiber test assembly.

The strengths of the fibers in the sintered assemblies were rated on a scale of from 1 to 5, according to the resistance encountered in manually breaking off fiber portions extending above the tubesheet. A rating of 5 is considered excellent.

Various fines samples were examined with a scanning electron microscope (SEM). The specimen was prepared (in a dry room) by attaching a piece of tape having an adhesive layer on both sides to a specimen holder, sprinkling the tape piece with a sample of the fines, jarring off the excess particles and coating the tape and adhered particles in a gold plasma device with a gold layer about 200 to 300 Angstroms thick. The specimen was then immediately scanned at one or more selected magnifications and corresponding electron micrographs made.

An HIAC PC-320 Particle Size Analyzer (HIAC Division, Pacific Scientific Co.) was used to examine various fines batches. A suspension of less than 0.01 wt. % of fines is ultrasonically dispersed in cumene. One hundred milliliters of the suspension is pressurized through a horizontal, rectangular slit (60μ wide×3 mm long, for example, to form a vertically flowing sheet. A beam of light is passed through this sheet to an optical fiber light-sensing means. The number of particles in each of twelve successively larger, preselected size ranges is calculated electronically according to the number and cross-sectional areas of the particle shadows "seen" by the light sensor per 100 ml of the suspension. The flow rate and solids content of the suspension is adjusted as necessary for a count, in the 1–2μ size range, of at least 60,000 (preferably >100,000) particles per 100 ml of suspension.

The count for each channel is "normalized" (see Table 2) and number percents calculated for both the "raw" and normalized counts. Number and volume average diameters are calculated from the normalized counts, from which, in turn, the dispersity factor is derived. (In the event that some of the larger particles counted are suspected of being aggregates of smaller particles the sample dispersion is subjected to more energetic and/or prolonged sonication, and rescanned.)

The HIAC counts given in the examples are not corrected for the background counts ("noise") of the suspending solvent itself, because it was found that the magnitude of the error so introduced is of negligible significance for the purposes of the examples. It should also be noted that the reproducibility of the overall sampling and HIAC analysis procedure has been statistically assessed to only a limited extent but the differences between counts for different batches of fines are believed to be real enough so that the limited conclusions drawn herein are essentially correct.

All experiments described in the following examples were carried out in a controlled humidity environment, i.e., in a "dry room".

Examples 1, 2, 3 and 5 are for purposes of comparison and are not examples of the invention itself. Only the "coarse" (rod-milled) first-stage products obtained in Examples 2B, 4 and 6 were "finish-ground" according to U.S. Pat. No. 3,917,490 (to evaluate those products as feeds to amine grinding for production of tubesheet fines).

EXAMPLE 1

Grinding of a sodium borosilicate solder glass, essentially as per U.S. Pat. No. 3,917,490.

A quantity of glass having the composition 3.59 mol % $Na_2O$, 93.75 mol % $B_2O_3$ and 2.68 mol % $SiO_2$ was sparged as a melt with dry nitrogen overnight, formed into flakes and pulverized in a Braun pulverizer. The bulk and surface moisture contents of the glass were found, using a duPont 26–321 AMA Moisture Analyzer, to be 0.05 wt. % and 0.06 wt. %, respectively. A $-40$ mesh fraction of the pulverized glass was rolled with $1''\times 1''$ Alundum cylinders in an approximately $9''\times 9''$ cylindrical mullite mill jar. After rolling 30 hours at room temperature, the glass (powder) was tightly adhered to the balls. On the assumption the mill was overloaded, a major portion of the glass was removed from it and the remainder rolled (ground) at 90° C. for 1.5 hours. The glass was still packed on the balls but loosened noticeably after being rolled with about 1 wt. % of hexadecyl amine for another 1.5 hours at 90° C. After rolling 18 hours more at 90° C., the amine-containing powder was completely loose and was not discernibly agglomerated. However, at this stage (total of 51 hours of grinding), the powder was too coarse to form an extrudeable paste.

100 Grams of the glass powder was mixed with about 1.5 grams of hexadecylamine and rolled in a resin-sealed, $6''\times 6''$ mullite jar with $0.5''\times 0.5''$ Alundum cylinders at 90° for 114 hours.

A readily extruded, tacky and non-slumping paste (93 wt. % solids) was obtained by mixing 4.5 grams each of the product fines and spheres (about 40–60μ diameter) of the same glass with 0.7 grams of a 1 wt. % solution of hexadecylamine in cumene.

A typical HIAC particle size analysis for fines produced in essentially the preceding manner from a glass of the above composition is given below. (Fines sonicated ~5 minutes in cumene.)

TABLE 2

| | | | | | | | | | |
|---|---|---|---|---|---|---|---|---|---|
| HIAC ANALYSIS OF FINES MADE BY PRIOR ART METHOD | | | | | | | | | |
| HIAC Channel | Particle Size Range | Median Diam. $\bar{D}$ | Channel Width w | Particle Count n | | No. % 100n $\Sigma n$ | Normalized Count n/w | Normalized Percents | |
| | | | | | $\bar{D}\times n$ | | | Number % | Volume % |
| 1 | 1–2μ | 1.5μ | 1μ | 93,180 | 139,770 | 52.76 | 93,180 | 69.09 | 3.00 |
| 2 | 2–4 | 3 | 2 | 40,172 | 120,516 | 22.75 | 20,086 | 14.89 | 5.18 |
| 3 | 4–6 | 5 | 2 | 21,958 | 109,790 | 12.43 | 10,979 | 8.14 | 13.11 |
| 4 | 6–8 | 7 | 2 | 11,217 | 78,519 | 6.35 | 5,608.5 | 4.16 | 18.38 |
| 5 | 8–10 | 9 | 2 | 5,995 | 53,955 | 3.39 | 2,997.5 | 2.22 | 20.87 |
| 6 | 10–12 | 11 | 2 | 2,468 | 27,148 | 1.40 | 1,232.0 | 0.91 | 15.69 |
| 7 | 12–14 | 13 | 2 | 959 | 12,467 | 0.54 | 479.5 | 0.36 | 10.06 |
| 8 | 14–16 | 15 | 2 | 346 | 5,190 | 0.20 | 173.0 | 0.13 | 5.58 |
| 9 | 16–18 | 17 | 2 | 143 | 2,431 | 0.08 | 71.5 | 0.05 | 3.36 |
| 10 | 18–20 | 19 | 2 | 93 | 1,767 | 0.05 | 46.5 | 0.03 | 3.05 |
| 11 | 20–25 | 22.5 | 5 | 55 | 1,238 | 0.03 | 11.0 | 0.01 | 1.20 |
| 12 | 25–60 | 42.5 | 35 | 25 | 1,063 | 0.01 | 0.7 | 0.00 | 0.52 |
| | | | | 176,611 | 553,854 | | 134,865.2 | | |

Unnormalized No. Av. Diam. = $\Sigma 0.67 \bar{D}n \div \Sigma n = 0.67\Sigma\bar{D}n \div \Sigma n = 0.67\times 553{,}854/176{,}611 = 0.67\times 3.136 = 2.101\mu$
Normalized:
No. Avg. Diam. = $0.67\Sigma(\bar{D}n/w) \div \Sigma n/w = 0.67\times 2.565 = 1.719\mu$
Vol. Avg. Diam. = $0.67\Sigma(\bar{D}n/w) \div \Sigma(\bar{D}n/w) = 0.67\times 9.533 = 6.387\mu$
Dispersity Factor = $9.533/2.565 = 3.717$
Note: Each average diameter is multiplied by 0.67 to correct for the non-sphericity of the particles; the counter is calibrated with spherical particles.

EXAMPLE 2

Unsuccessful attempts to more rapidly produce tube-sheet fines, grinding with mild steel balls.

A. Grinding eight hours at ambient temperature, with no amine present.

300 Grams of freshly prepared flat strips of a sodium borosilicate glass having the composition 3.98 mol % $Na_2O$, 93.20 mol % $B_2O_3$ and 2.82 mol % $SiO_2$ was charged, with 12.3 kilograms of dry, mild steel balls (a mixture of about equal weights of 5/16", 0.5" and 1" balls), to a dry, cylindrical, stainless steel mill fitted with six welded-on lifters. After the mill had rotated for eight hours at ambient temperature, the glass had been converted to a powder but a high proportion of it was caked on the mill and ball surfaces.

B. Grinding eight hours at 100° C. in presence of amine.

The preceding experiment (A) was essentially repeated except that 1.5 wt. % (based on the glass) of hexadecyl amine was charged with the glass and the grinding was done in an oven at 100° C.

An HIAC particle size analysis for the resulting glass powder—which did not cake—is given in Table 3 below.

TABLE 3

| | | | | | | | | |
|---|---|---|---|---|---|---|---|---|
| HIAC ANALYSIS. FINES GROUND WITH STEEL BALLS AND AMINE FOR 8 HOURS AT 100° C. | | | | | | | | |
| Particle | Median | Channel | Particle | | | Normalized | | |
| Size Range | Diam. $\bar{D}$ | Width w | Count n | $\bar{D} \times n$ | No. % $100n/\Sigma n$ | Count n/w | No. % | Vol. % |
| 1–2µ | 1.5µ | 1µ | 104,221 | 104,221 | 54.63 | 104,221 | 70.67 | 3.17 |
| 2–4 | 3 | 2 | 45,514 | 136,542 | 23.86 | 22,757 | 15.43 | 5.54 |
| 4–6 | 5 | 2 | 21,285 | 106,425 | 11.16 | 10,642.5 | 7.22 | 12.00 |
| 6–8 | 7 | 2 | 10,387 | 72,709 | 5.44 | 5,193.5 | 3.52 | 16.07 |
| 8–10 | 9 | 2 | 4,879 | 43,911 | 2.56 | 2,439.5 | 1.65 | 16.04 |
| 10–12 | 11 | 2 | 2,312 | 25,432 | 1.21 | 1,156 | 0.78 | 13.88 |
| 12–14 | 13 | 2 | 1.058 | 13,754 | 0.55 | 529 | 0.36 | 10.48 |
| 14–16 | 15 | 2 | 576 | 8,640 | 0.30 | 288 | 0.20 | 8.77 |
| 16–18 | 17 | 2 | 270 | 4,590 | 0.14 | 135 | 0.09 | 5.98 |
| 18–20 | 19 | 2 | 218 | 4,142 | 0.11 | 109 | 0.07 | 6.74 |
| 20–25 | 22.5 | 5 | 64 | 1,440 | 0.03 | 13 | 0.01 | 1.32 |
| 25–60 | 42.5 | 35 | 0 | 0 | 0 | 0 | 0 | 0 |
| | | | 190,776 | 521,806 | | 147,475 | | |

Unnormalized No. Avg. Diam = 2.735µ
Corrected for non-sphericity 2.735 × 0.67 = 1.832µ
Normalized and corrected for non-sphericity of particles:
No. Avg. Diam. 2.473 × 0.67 = 1.657µ
Vol. Avg. Diam. 10.182 × 0.67 = 6.822µ
Dispersity Factor = 10.182/2.473 = 4.117

The data obtained from an HIAC analysis on the resulting product are given in Table 4 following.

TABLE 4

| | | | | | | | |
|---|---|---|---|---|---|---|---|
| HIAC ANALYSIS ON RUN B FINES AFTER ADDITIONAL GRINDING WITH ALUNDUM "BALLS" AT 100° C. | | | | | | | |
| | | | | | | Normalized | |
| $\bar{D}$ | w | n | No. % | $\bar{D} \times n$ | n/w | No. % | Vol. % |
| 1.5 | 1 | 90,897 | 63.05 | 136,481 | 90.897 | 77.38 | 6.16 |
| 3 | 2 | 31,385 | 21.77 | 94,155 | 15,693 | 13.36 | 8.51 |
| 5 | 2 | 12,629 | 8.76 | 63,145 | 6,315 | 5.38 | 15.86 |
| 7 | 2 | 5,504 | 3.82 | 38,528 | 2,752 | 2.34 | 18.97 |
| 9 | 2 | 2,084 | 1.45 | 18,756 | 1,042 | 0.89 | 15.26 |
| 11 | 2 | 886 | 0.61 | 9,746 | 443 | 0.38 | 11.85 |
| 13 | 2 | 336 | 0.23 | 4,368 | 168 | 0.14 | 7.42 |
| 15 | 2 | 170 | 0.12 | 2,550 | 85 | 0.07 | 5.76 |
| 17 | 2 | 63 | 0.04 | 1,071 | 32 | 0.03 | 3.11 |
| 19 | 2 | 65 | 0.05 | 1,235 | 33 | 0.03 | 4.48 |
| 22.5 | 5 | 57 | 0.04 | 1,283 | 11 | 0.01 | 2.61 |
| 42.5 | 35 | 0 | 0 | 0 | 0 | 0 | 0 |
| | | 144,166 | | 371,318 | 117,468 | | |

Unnormalized No. Avg. Diam. = 2.576µ
Corrected for non-sphericity = 2.576 × 0.67 = 1.726µ
Normalized and corrected for non-sphericity of particles:
No. Avg. Diam. 2.157 × 0.67 = 1.445µ
Vol. Avg. Diam. 8.942 × 0.67 = 5.991µ
Dispersity Factor = 8.942/2.157 = 4.146

It is evident from a comparison of Tables 3 and 4 that

Comparing Tables 2 and 3, it might be anticipated that the fines produced in run B, being more finely ground and having a higher dispersity factor, would be at least as good as fines made by the prior art method of Example 1. However, an attempt to make an extrudeable paste with the run B product failed. A mixture of 2 grams each of the fines and spheres (of the same type utilized in Example 1) with 0.34 grams of a solution of 1 wt. % each of hexadecylamine and dodecylamine in cumene (mixture ~92 wt. % solids) was quite "dry" and did not yield a paste even when further diluted with the cumene solution to a solids content of about 84 wt. % (On the basis of other work, the differences in composition of the two glasses are not considered to account for the observed differences in the cumene/amine slurries of the corresponding fines.)

C. One hundred grams of the run B (amine-coated) fines were charged to a dry mullite mill jar with Alundum "balls" (short cylinders) of the same type used in Example 1 and ground at 100° C. for about 90 hours.

further particle size reduction resulted from the Alundum ball milling. Also, the dispersity factor increased somewhat. However, an extrudeable paste still could not be formed from the fines (with spheres, cumene, etc.). Thus, the initial grind method of run B did not produce a suitable feed for the amine grind (run C).

D. Attempt to produce fines suitable for tube-sheet preparation by prolonged, single-stage grinding (at 100° C. in presence of amine) with stainless steel balls.

A quantity of a solder glass having the composition 93.6 mol % $B_2O_3$, 3.9 mol % $Na_2O$ and 2.5 mol % $SiO_2$ was pulverized and sieved. 300 grams of the −325 mesh fraction was charged to a steel mill fitted with six lifters and milled with a total of 13 kilograms of 440-stainless steel balls (a mixture of about equal weights of 0.25", 0.5" and 1" diameter balls) for 16 hours at 100° C. with 1.5 wt. % (based on the glass) of hexadecylamine.

20 Gram samples of the ground glass were removed after 8 and 16 hours of grinding. The remainder of the glass was sieved and the −50 mesh (219 grams) fraction was milled another 8 hours at 100° with 1.5 wt. % hexadecylamine.

An HIAC analysis of the resultant fines showed that the number average particle diameter (unnormalized, corrected for non-sphericity) was 2.76 microns (as compared to 1.832 microns for the run B fines and 2.101 microns for the fines produced in Example 1 according to the prior art method of grinding). SEM examination of the not-preground product particles showed that they were much more angular than the "standard" (prior art) pre- and finish-ground particles.

Surprisingly, it was possible to prepare an extrudeable paste with the angular fines, by using a substantially higher than "normal" (~16 mol %) proportion of cumene/amine solution. However, the paste slumped noticeably (and the % solids was too low to provide a good packing density in a sintered tubesheet).

Again, the differences in the run B and run D fines is not believed attributable to the differences in compositions of the glasses ground in the two experiments.

The HIAC analysis for the product ground 24 hours is given in Table 5 below.

TABLE 5

HIAC ANALYSIS OF FINES GROUND 24 HOURS @ 100° C. WITH STAINLESS STEEL BALLS IN PRESENCE 1.5 WT. % HEXADECYLAMINE

| $\overline{D}$ | w | n | n/w | $\overline{D} \times n$ | No. % | Normalized Values No. % | Vol. % |
|---|---|---|---|---|---|---|---|
| 1.5μ | 1μ | 60,813 | 60,813 | 91,220 | 37.95 | 55.04 | 1.06 |
| 3 | 2 | 38,054 | 19,027 | 114,162 | 23.75 | 17.22 | 2.64 |
| 5 | 2 | 24,988 | 12,494 | 124,940 | 15.60 | 11.31 | 8.04 |
| 7 | 2 | 16,573 | 8,287 | 116,011 | 10.34 | 7.50 | 14.63 |
| 9 | 2 | 9,619 | 4,810 | 86,571 | 6.00 | 4.35 | 18.05 |
| 11 | 2 | 5,587 | 2,794 | 61,457 | 3.49 | 2.53 | 19.14 |
| 13 | 2 | 2,582 | 1,291 | 33,566 | 1.61 | 1.17 | 14.60 |
| 15 | 2 | 1,204 | 602 | 18,060 | 0.75 | 0.54 | 10.46 |
| 17 | 2 | 481 | 240 | 8,177 | 0.30 | 0.22 | 6.08 |
| 19 | 2 | 256 | 128 | 4864 | 0.16 | 0.12 | 4.52 |
| 22.5 | 5 | 65 | 13 | 1,463 | 0.04 | 0.01 | 0.76 |
| 42.5 | 35 | 3 | — | 128 | 0.002 | — | 0.03 |
|  |  | 160,225 | 110,499 | 660,619 |  |  |  |

Unnormalized No. Avg. Diam. 4.123μ
Corrected for non-sphericity 4.123 × 0.67 = 2.76μ
Normalized:
No. Avg. Diam. 3.398 × 0.67 = 2.277μ
Vol. Avg. Diam. 10.795 × 0.67 = 7.233μ
Dispersity Factor = 10.795/3.398 = 3.177

EXAMPLE 3

Rapid initial size reduction by stainless steel rod milling, with and without amine present; unsuccessful "finish" grinding with stainless steel rods or balls in presence of amine.

Trial A1

100 Grams of glass ribbon and flakes having the composition 3.5 mole % $Na_2O$, 93.7 mole % $B_2O_3$ and 2.8 mole % $SiO_2$ were charged to a dry, 8" diameter stainless steel mill "jar" with five dry, 1.25"×8.5" stainless steel rods. The mill was rotated at 75 rpm, at room temperature. A sample of the fines was withdrawn after 0.5 hour and again when grinding was terminated; 1.5 hours total. No caking had occurred.

Note: The stainless steel mill "jar" used was the one (with a "scalloped" inner surface) referred to earlier herein as having given the best results.

The 0.5 and 1.5 hour samples were subjected to HIAC analysis. The average diameters given below (Table 6) are connected for non-sphericity but not normalized.

TABLE 6

| Sample | No. Av. Diam. | Vol. Av. Diam. | Dispersity Factor |
|---|---|---|---|
| 0.5 hr. | 4.962 | 16.392 | 3.304 |
| 1.5 hr. | 4.805 | 14.875 | 3.096 |

A mixture of 2 grams each of the 1.5 hour fines and spheres with 0.6 grams of a cumene solution of 1% each of dodecylamine and hexadecylamine (mixture 87 wt. % solids) was too "dry" to be extruded.

Trial A2

50 Grams of the 1.5 hour fines (Trial A1) were charged to a dry, rubber-lined mill jar with 24 dry, ¾" stainless steel balls and 0.75 ml (~1.5 wt. % based on fines) of N,N-dimethyldodecylamine. The mill was rotated two hours (in an oven) at 100° C., then allowed to cool (unopened) in a dry room.

A mixture of 2 grams of the resulting fines with 2 grams of spheres (same glass as fines) and a total of 0.6 grams of cumene/amine solution (mixture ~87 wt. % solids) gave a "sandy" paste which was somewhat extrudeable but was not "tacky".

The remaining fines were ground an additional hour with the stainless steel balls in the rubber-lined mill, at 100° C., and allowed to cool as before. An extrudeable, tacky paste still could not be made (with spheres and cumene/amine solution) from the product fines.

Trial B

100 Grams of the same glass used in Trial A were mixed with 1.5 wt. % of N,N-dimethyldodecylamine and ground at 75 rpm for a total of 4 hours at room temperature with the five stainless steel rods in the stainless steel mill "jar". Again, the mixture formed from 2 grams each of the fines and spheres and 0.5 g. of cumene/amine solution (mixture ~89 wt. % solids) was sandy and non-extrudeable. By HIAC analysis, the normalized and non-sphericity corrected number and volume average diameters for these fines were 2.417μ and 9.96μ, respectively; dispersity factor 4.12.

Trial C1

Trial A1 was essentially repeated, except that the dry grinding was prolonged for a total of 3 hours. The results of an HIAC analysis on the resulting fines are given in Table 7 below. Preparation of an extrudeable paste from these fines, sans further treatment, was not attempted.

TABLE 7

HIAC ANALYSIS. FINES GROUND IN STAINLESS STEEL ROD MILL FOR 3 HOURS, IN ABSENCE OF AMINES, AT ROOM TEMPERATURE

| $\overline{D}$ | w | n | n/w | $\overline{D} \times n$ | No. % | Normalized Values No. % | Vol. % |
|---|---|---|---|---|---|---|---|
| 1.5μ | 1μ | 89,212 | 89,212 | 133,818 | 9.32 | 58.18 | 0.50 |
| 3 | 2 | 46,353 | 23,177 | 139,059 | 12.96 | 15.11 | 1.05 |
| 5 | 2 | 27,778 | 13,889 | 138,890 | 12.94 | 9.06 | 2.91 |
| 7 | 2 | 16,874 | 8,437 | 118,118 | 11.01 | 5.50 | 4.85 |
| 9 | 2 | 11,342 | 5,671 | 102,078 | 9.51 | 3.70 | 6.92 |
| 11 | 2 | 7,599 | 3,799 | 83,589 | 7.79 | 2.48 | 8.47 |
| 13 | 2 | 5,389 | 2,699 | 70,057 | 6.53 | 1.76 | 9.91 |
| 15 | 2 | 3,687 | 1,844 | 55,305 | 5.15 | 1.20 | 10.42 |
| 17 | 2 | 2,739 | 1,369 | 46,563 | 4.34 | 0.89 | 11.27 |
| 19 | 2 | 4,875 | 2,438 | 92,625 | 8.63 | 1.59 | 28.00 |

TABLE 7-continued

HIAC ANALYSIS. FINES GROUND IN STAINLESS STEEL ROD MILL FOR 3 HOURS, IN ABSENCE OF AMINES, AT ROOM TEMPERATURE

| $\overline{D}$ | w | n | n/w | $\overline{D} \times n$ | No. % | Normalized Values No. % | Vol. % |
|---|---|---|---|---|---|---|---|
| 22.5 | 5 | 4,098 | 814 | 92,205 | 8.59 | 0.53 | 15.63 |
| 42.5 | 35 | 19 | 0.54 | 665 | 0.06 | — | 0.07 |
|  |  | 219,965 |  | 1,072,972 |  |  |  |

Unnormalized No. Avg. Diam. = 1,072,972/219,965 = 4.878μ
Corrected for non-sphericity 4,878 × 0.67 = 3.268μ
Normalized:
No. Avg. Diam. = 3.752μ
Vol. Avg. Diam. = 15.712μ
Corrected:
0.67 × 3.752 = 2.514μ
0.67 × 15.712 = 10.527μ
Dispersity Factor = 15.712/3.752 = 4.188

Trial C2

To the C1 fines was added 1.5 wt. % of N,N-dimethyldodecylamine and grinding was resumed for another hour (still at room temperature). A marginally tacky paste which was almost extrudeable was obtained by mixing 2 grams of the resulting powder with 2 grams of spheres (same glass) and 0.6 grams of the cumene/amine solution (mixture ~87 wt. % solids).

Trial C3

8 Grams of the C2 (amine-treated) fines were ground at 100° C. in the rubber lined mill with twelve of the ¾" stainless steel balls, for 2.25 hours. A paste having marginal extrudeability but not really adequate tackiness resulted when 1 gram of the ball-ground fines and 1 gram of spheres (same glass) were combined with 0.2 grams of the cumene/amine solution (mixture ~91% solids). Addition of another 0.1 gram of the solution resulted in too "wet" a mixture (~87% solids). These fines were not subjected to HIAC analysis.

Trial C4

50 Grams of the C2 (amine-treated) fines were charged to the rubber-lined mill with 2470 grams of the μ" stainless steel balls and rolled for 19.5 hours at 100° C. (in an oven). A marginally extrudeable and tacky paste was obtained by mixing 2.1 grams each of the product fines and spheres (same glass) with 0.5 gram of the cumene/amine solution (mixture 89.4 wt. % solids).

The results of an HIAC analysis on the latter fines are given in Table 8, below.

TABLE 8

| $\overline{D}$ | w | n | n/w | $\overline{D} \times n$ | No. % | Normalized Values No. % | Vol. % |
|---|---|---|---|---|---|---|---|
| 1.5μ | 1μ | 243,833 | 243,833 | 365,750 | 38.09 | 55.19 | 1.28 |
| 3 | 2 | 164,466 | 82,233 | 493,398 | 25.69 | 18.61 | 3.44 |
| 5 | 2 | 106,570 | 53,285 | 532,850 | 16.65 | 12.06 | 10.33 |
| 7 | 2 | 61,080 | 30,540 | 427,560 | 9.54 | 6.91 | 16.25 |
| 9 | 2 | 34,623 | 17,312 | 311,607 | 5.41 | 3.92 | 19.57 |
| 11 | 2 | 16,631 | 8,316 | 182,941 | 2.60 | 1.88 | 17.16 |
| 13 | 2 | 7,376 | 3,688 | 95,888 | 1.15 | 0.83 | 12.57 |
| 15 | 2 | 2,870 | 1,435 | 43,050 | 0.45 | 0.32 | 7.51 |
| 17 | 2 | 1,146 | 573 | 19,482 | 0.18 | 0.13 | 4.37 |
| 19 | 2 | 1,021 | 511 | 19,399 | 0.16 | 0.12 | 5.43 |
| 22.5 | 5 | 584 | 117 | 13,140 | 0.09 | 0.03 | 2.06 |
| 42.5 | 35 | 10 | 0.29 | 425 | — | — | 0.03 |
|  |  | 640,210 | 441,843 | 2,505,490 |  |  |  |

Unnormalized No. Avg. Diam. = 3.914μ
Corrected: 3.914 × 0.67 = 2.622μ
Normalized:
No. Avg. Diam. = 3.240μ
Vol. Avg. Diam. = 10.438μ
Corrected:
3.240 × 0.67 = 2.171μ
10.438 × 0.67 = 6.993μ
Dispersity Factor = 10.438/3.24 = 3.222

Trial D1

100 Grams of glass flakes of essentially the same composition as that employed in Trial 1 were ground 5 hours in the stainless steel rod mill at room temperature, with five 1.25"×8.5" stainless steel rods; amine was present during this period. The resultant powder was adhered to the rod and mill surfaces, but could be knocked loose. After a 20-gram sample was removed, 1.2 grams of hexadecylamine was added to the remainder of the glass and grinding was resumed, at "room temperature" (actually, some temperature rise results from the heat liberated in the grinding process) for another two hours. A mixture of 2 grams of the resultant fines with 2.1 grams of spheres (same glass) and 0.6 gram of cumene was tacky but non-extrudeable. In order to get an extrudeable paste, it was necessary to add another ~0.8 gram of cumene (solids content in final mixture ~75 wt. %). Some "lock-up" in the syringe used for the test extrusion occurred.

Trial D2

The D1 (amine-treated) fines were ground with steel balls in the rubber-lined mill, at 100° C., for about 20 hours. A tacky paste which could be extruded from a syringe, but with some "lock-up", was obtained by mixing 1.2 grams of the ball-ground fines with 1 gram of spheres and 0.2 gram of cumene. The solids content of this paste was about 92 wt. %.

Neither the D1 or D2 product fines were subjected to HIAC analysis.

EXAMPLE 4

Initial grinding with stainless steel rods, followed by grinding with Alundum "balls" in presence of amine at 100° C.

A. "Coarse" grind.

250 Grams total of several different batches of glass having essentially the same composition as the glass employed in Trial A, Example 3, (and having a bulk moisture content of about 0.05 wt. %) were charged to the stainless steel rod mill and ground (at 75 rpm) with the five rods at room temperature for about 8 hours. (Grinding was interrupted several times due to difficulties in keeping the "lid" on the mill; some loss of glass from the mill occurred.) The fines produced were caked on the rod and mill surfaces to some extent but were readily scraped off. A sample was taken for HIAC analysis.

B. Fine grind, with amine.

46.6 Grams of the "coarse" ground glass were ground in a mullite mill "jar" with Alundum "balls" (short cylinders) and ground for 1.75 hours at 76 rpm and 100° C. with no amine present. 0.7 Gram (1.5 wt. %) of 1-hexadecylamine was added to the glass and grinding was continued (at 100° C.) for 62.25 hours (total 64 hours). A sample of the resultant fines was subjected to HIAC analysis.

An excellent, tacky and extrudeable paste was obtained by mixing 2 grams of the fines, 2 grams of glass "spheres" (−150, +225 mesh; 95.5 wt. % $B_2O_3$, 4.5 wt. % $Na_2O$) and 0.38 gram of cumene/amine solution. The solids content of the mixture was 91.32 wt. %.

Using a paste of the preceding composition, a foil, fiber and tubesheet assembly was constructed ("rolled") essentially in the manner described earlier herein, except that the fibers used were not hollow. (The assembly simulated a hollow fiber unit suitable for use in a cell having a nominal capacity of 6 ampere hours.) The "green" bundle was heated for 0.5 hour under an infrared lamp, then pre-"cured" under reduced pressure ($\sim 2.5 \times 10^{-4}$ mmHg) at about 340° C. for about 2 hours. It was then sintered (in vacuo) at about 370° C. for 4.5 hours.

The fiber strength in the "cured" assembly was rated at 5. The tubesheet was not swollen and leaked helium (non-uniformly across its surface) at a rate of about $10^{-7}$ cc/second; this leakage was attributed to a fiber doublet.

Five more foil, fiber and tubesheet assemblies were rolled and "cured" (sintered) in essentially the same fashion, using the same paste. The fiber strength was rated at 5 in each assembly. Two of the assemblies exhibited unmeasureable helium leakage rates and the rates for the other three were $5 \times 10^{-3}$, $10^{-4}$ and $5 \times 10^{-6}$ cc/second.

The results of HIAC analyses on the "coarse" and fine ground glass are summarized in Table 9, following.

TABLE 9

PARTICLE SIZE DISTRIBUTIONS FOR "COARSE" AND "FINE" GROUND SODIUM BOROSILICATE GLASS

| | Unnormalized | | Normalized Values | | | |
| | No. % | | No. % | | Vol. % | |
| D | Coarse | Fine | Coarse | Fine | Coarse | Fine |
|---|---|---|---|---|---|---|
| 1.5μ | 48.56 | 79.39 | 65.84 | 88.51 | 0.64 | 25.75 |
| 3 | 10.32 | 15.92 | 13.09 | 8.87 | 1.02 | 20.65 |
| 5 | 10.08 | 3.57 | 6.83 | 1.99 | 2.45 | 21.47 |
| 7 | 5.90 | 0.79 | 4.00 | 0.44 | 3.94 | 13.05 |
| 9 | 4.04 | 0.21 | 2.74 | 0.12 | 5.74 | 7.32 |
| 11 | 2.94 | 0.06 | 1.99 | 0.03 | 7.61 | 3.89 |
| 13 | 2.21 | 0.04 | 1.50 | 0.02 | 9.48 | 4.10 |
| 15 | 1.67 | — | 1.13 | — | 11.00 | 0.63 |
| 17 | 1.27 | — | 0.86 | — | 12.16 | 0.46 |
| 19 | 2.30 | — | 1.56 | — | 30.70 | — |
| 22.5 | 1.70 | 0.01 | 0.46 | — | 15.07 | 2.66 |
| 42.5 | 0.02 | — | — | — | 0.19 | — |

| | Coarse | Fine |
|---|---|---|
| Unnormalized, Corrected No. Avg. Diam: | 3.011μ | 1.697 |
| Normalized, Corrected No. Avg. Diam: | 2.263 | 1.168 |
| Vol. Avg. Diam.: | 10.751 | 3.609 |
| Dispersity Factor | 4.751 | 3.090 |

EXAMPLE 5

Prolonged grinding in rod mill, followed by grinding with steel balls in mullite mill (with amine, at $\sim 100°$ C.). Unsuccessful.

200 Grams of glass flakes, of essentially the same composition as that employed in Example 4 was ground at room temperature for 4 hours at 75 rpm in the stainless steel rod mill; the lid came off the "jar" and about half the glass was lost. The remainder was ground an additional 18 hours, for a total of 22 hours.

97.5 Grams of the resulting fines were ground with 1.45 grams of 1-hexadecylamine and 1034 grams of 0.5" diameter stainless steel balls in a pre-dried mullite mill, at 93° C. and 79 rpm for about 72 hours.

A paste was not obtained by mixing 2 grams each of the product powder and −140, +200 mesh glass spheres with 0.42 gram of cumene/amine solution. The mixture was not discernibly wet. Addition of another 0.2 gram of the cumene solution gave a thick "paste" (86.6 wt. % solids) which was neither tacky nor extrudeable.

It is thus apparent that comparable results were not attained when steel balls were substituted for Alundum balls in the otherwise conventional amine grind (see Example 3-A2, also).

The results of an HIAC analysis on a sample of the product powder are given in Table 10 below.

TABLE 10

HIAC ANALYSIS OF FINES MADE BY STEEL BALL-MILLING ROD-MILLED PARTICLES IN MULLITE MILL

| | Unnormalized | Normalized Values | |
| D | No. % | No. % | Vol. % |
|---|---|---|---|
| 1.5 | 62.22 | 76.72 | 6.56 |
| 3 | 22.42 | 13.82 | 9.45 |
| 5 | 9.31 | 5.74 | 18.17 |
| 7 | 3.87 | 2.39 | 20.72 |
| 9 | 1.35 | 0.83 | 15.33 |
| 11 | 0.48 | 0.30 | 10.03 |
| 13 | 0.15 | 0.09 | 5.01 |
| 15 | 0.08 | 0.05 | 4.06 |
| 17 | 0.03 | 0.02 | 2.33 |
| 19 | 0.05 | 0.03 | 5.27 |
| 22.5 | 0.04 | 0.01 | 2.96 |
| 42.5 | — | — | 0.12 |

Unnormalized, Corrected No. Avg. Diam. 1.723μ
Normalized, Corrected No. Avg. Diam. 1.445μ
Vol. Avg. Diam. 5.762μ
Dispersity Factor 3.987

EXAMPLE 6

Verification of results in Example 4, avoiding losses of glass during rod-milling.

200 Grams of a sodium borosilicate glass flakes having the nominal composition 4 mole % $Na_2O$, 93 mole % $B_2O_3$ and 3 mole % $SiO_2$ were ground 8.5 hours at 75 rpm and at room temperature in the stainless steel rod mill. The resulting "coarse" ground powder was sampled for HIAC analysis and a mixture of 100 grams of the powder and 1.5 grams of n-hexadecylamine was ground with 1200 grams of Alundum "balls" in the mullite mill, at 79 rpm and at $\sim 100°$ C., for about 72 hours.

A very extrudeable, tacky paste was obtained by mixing 3 grams of the Alundum-ground fines, 3 grams of glass spheres and 0.5 gram of a cumene solution of 2 wt. % n-hexadecylamine and 3 wt. % dodecyl amine; solids content of paste, 92.3 wt. %.

The results of HIAC analyses on the coarse (rod-milled) and fine (Alundum "ball"-milled) products are given in Table 11, below.

TABLE 11

HIAC ANALYSES ON COARSE- AND FINISH-GROUND POWDERS

| | Unnormalized | | Normalized Values | | | |
| | No. %'s | | No. %'s | | Vol. %'s | |
| D | Coarse | Fine | Coarse | Fine | Coarse | Fine |
|---|---|---|---|---|---|---|
| 1.5μ | 47.24 | 52.77 | 64.25 | 69.14 | 1.67 | 1.97 |
| 3 | 25.42 | 22.55 | 17.29 | 14.77 | 3.60 | 3.37 |
| 5 | 13.21 | 11.16 | 8.99 | 7.31 | 8.67 | 7.72 |

TABLE 11-continued

HIAC ANALYSES ON COARSE- AND FINISH-GROUND POWDERS

| $\overline{D}$ | Unnormalized No. %'s | | Normalized Values | | | |
|---|---|---|---|---|---|---|
| | | | No. %'s | | Vol. %'s | |
| | Coarse | Fine | Coarse | Fine | Coarse | Fine |
| 7 | 6.88 | 6.00 | 4.68 | 3.93 | 12.38 | 11.40 |
| 9 | 3.09 | 3.26 | 2.10 | 2.13 | 11.84 | 13.14 |
| 11 | 1.71 | 1.87 | 1.16 | 1.22 | 11.93 | 13.75 |
| 13 | 0.86 | 0.97 | 0.59 | 0.64 | 9.95 | 11.86 |
| 15 | 0.55 | 0.58 | 0.37 | 0.38 | 9.70 | 10.92 |
| 17 | 0.30 | 0.29 | 0.20 | 0.19 | 7.71 | 7.80 |
| 19 | 0.42 | 0.34 | 0.28 | 0.22 | 15.03 | 12.85 |
| 22.5 | 0.31 | 0.20 | 0.85 | 0.05 | 7.45 | 5.16 |
| 42.5 | — | — | — | — | 0.06 | 0.07 |

| | Coarse | Fine |
|---|---|---|
| Unnormalized, Corrected No. Avg. Diam.: | 2.329µ | 2.224µ |
| Normalized, Corrected No. Avg. Diam.: | 1.887µ | 1.792µ |
| Vol. Avg. Diam.: | 8.328 | 8.138 |
| Dispersity Factor | 4.413 | 4.541 |

EXAMPLE 7

Use of rod mill for fast initial grind of binary sodium borate-type glass.

200 Grams of glass flakes having the composition 4.5 mole % $Na_2O$ and 95.5 mole % $B_2O_3$ were ground at room temperature in the stainless steel mill at 75 rpm with the 5 stainless steel rods for 8 hours. 97.5 Grams of the resulting "coarse" powder, in admixture with 1.46 grams of 1-hexadecylamine, were ground with 1100 grams of pre-dried Alundum "balls" in a pre-dried mullite mill at 100° C. for 56 hours.

A tacky, extrudeable paste was obtained by mixing 4 grams each of the resulting fines and −140+270 mesh glass spheres with ∼0.56 grams of a solution of 1 wt. % each of 1-hexadecylamine and 1-dodecylamine (solids content of pasted ∼93.4 wt. %).

An HIAC analysis was not run on the product of either stage of grinding.

EXAMPLE 8

Effects of rod weight.

Seven, essentially identical, hollow rods (1¼" diameter×8½" long; average weight 531 grams each) were made up from lengths of stainless steel pipe, closed at each end by welding in stainless steel end plates. One of the latter plates in each rod was drilled, tapped and fitted with a removeable ⅜", flush-fitting plug, for introduction to or removal from the rod interior of filler materials.

A series of three runs were made with the rods empty, lead shot-filled (av. wt. 1377 grams) and solidly lead-filled (av. wt. 1852 grams). 100 Grams of ternary glass flakes (such as those used in Examples 4 and 6) was ground, in each run, in the 8" diameter, scalloped wall, stainless steel mill. Samples of the ground glass were taken after 2 and 4 hours grinding time in the runs made with the empty and solidly leadfilled rods. Samples were taken after 8 hours in all three runs. HIAC analyses were carried out on all samples. The highest (normalized) volume percent of particles reporting in any "channel" in those samples were as follows: empty rods, 15.5% in 6–8µ range; shot-filled, 13.6% in 6–8µ range and solidly filled, 16.5% in the 8–10µ range. The volume percent figures for the other channels were similarly close and no really significant effect of rod weight was apparent.

SIGNIFICANCE OF EXAMPLES

It is evident from the foregoing examples that:
(1) more rapid initial particle size reduction is achieved by rod-milling than by ball-milling;
(2) if the rod-milled product is to be utilized for tube-sheet fabrication, it must be finish-ground with Alundum "balls" in the presence of an amine and at an elevated temperature.

What is claimed is:

1. The method of grinding an alkali metal borate glass which comprises:
   a. charging to a rod mill particles of said glass comprising from about 60 to about 97 mole percent of $B_2O_3$ and a total of from about 3 to about 30 mole percent of one or more alkali metal oxides, said glass having a Vickers hardness number of from about 200 to about 700, said rods and the mill lining having Vickers numbers higher than that of the glass and being composed of the same or different, non-brittle materials;
   b. grinding said glass in said mill until the particles have a volume average diameter greater than 7, up to about 11 microns and a dispersity factor greater than 4, up to about 5; and
   c. grinding the resultant powder with Alundum balls, while in contact with a $C_{12}$–$C_{42}$ aliphatic amine and at a temperature which is greater than 50° C. but less than the softening point of said glass, until at least some of the powder particles have been reduced to fragments having effective diameters of less than one micron.

2. The method of claim 1 in which the mill employed in step c is lined with or consists of mullite and the powder is ground therein in contact with a total of about 1.5% of its weight of n-dodecyl amine, n-hexadecyl amine or both.

3. The method of claim 1 in which said glass consists essentially of from 93.0 to 93.8 mole percent $B_2O_3$, from 3.5 to 4.0 mole percent $Na_2O$ and from 2.7 to 3.0 mole percent $SiO_2$.

4. The method of claim 2 wherein said glass consists essentially of about 93.20 mole percent $B_2O_3$, about 3.98 mole percent $Na_2O$ and about 2.82 mole percent $SiO_2$.

* * * * *